WARREN A. ALEXANDER &
ROSCOE W. MITCHELL JR. INVENTORS

BY John D. Gassett
ATTORNEY

WARREN A. ALEXANDER &
ROSCOE W. MITCHELL JR. INVENTORS

BY John D. Gassett
ATTORNEY

United States Patent Office 3,260,887
Patented July 12, 1966

3,260,887
SEISMIC DISPLAY SYSTEM
Warren A. Alexander and Roscoe W. Mitchell, Jr., Tulsa, Okla., assignors, by mesne assignments, to Esso Production Research Company, Houston, Tex., a corporation of Delaware
Filed Oct. 2, 1962, Ser. No. 227,778
2 Claims. (Cl. 315—9)

This invention relates generally to a display system for seismic signals. It relates especially to a system wherein a group of seismic signals are arranged in a side-by-side relationship and are displayed on an oscilloscope, for example.

In the general method of seismic exploration, a seismic disturbance such as an explosion of dynamite is generated at or near the surface of the earth. Seismic waves are thus transmitted downwardly through the earth. The waves continue to travel downwardly within the earth until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated into electrical impulses which are then indicative of the character of the ground motion and are usually referred to collectively as a seismic signal. The seismic signal is in effect a composite signal made up of a plurality of electrical signals varying in frequency and amplitude.

The seismic signals are detected at a plurality of locations. The various signals are arranged in a side-by-side relationship on a display medium and collectively form what is commonly called a seismic section. The composite signal, or its display, from each location is commonly referred to as a seismic trace. The seismic section is in effect a cross-sectional picture or display of a cross-section through the earth being surveyed. The seismic section is most commonly displayed by photographic methods. However, before the seismic section takes on a true meaning, many and various well known corrections, such as spread, time, velocity, etc., have to be applied to the various traces which make up the section. It is sometimes most difficult to know in advance just what the corrections should be. It is thus a frequent practice to make the corrections without a complete certainty that they are the best corrections. A photograph is then made of the seismic section, which is called a corrected seismic section. If the corrections are not suitable to the interpreter, other photographic copies have to be made of the same seismic section with other corrections incorporated therein. This, of course, is a time-consuming process.

This invention concerns a non-photographic type display system whereby a seismic section can be displayed for a considerable length of time so that it can be studied. The operator can then determine whether or not the corrections he has applied to the various traces are appropriate or if he desires other corrections. Additional corrections can be made to the seismic signal and the recorrected seismic section again displayed essentially immediately.

Thus it is an object of the invention to provide a non-photographic display system whereby a seismic section can be displayed for long periods of time.

Briefly, the invention utilizes an electrostatic storage tube upon which the seismic section, or a portion thereof, which is being studied is stored in variable levels of electric charge as a function of the seismic signal. This store of data is scanned by a read-out system and displayed on a large TV-type screen, for example. In order that the section displayed on the TV screen be of good quality, it is necessary to maintain the information stored in the storage tube in a strong condition. This is made possible by a rejuvenation loop in which a read-out signal contributes a part of the read-signal back to a read-in beam and reactivates the storage signal. Thus the seismic section can be stored on the electrostatic storage tube for long periods of time so that the display of the seismic section on the display screen can be observed and studied for whatever time is required.

Various objects and a better understanding of the invention can be had from the drawing.

Figure 2:
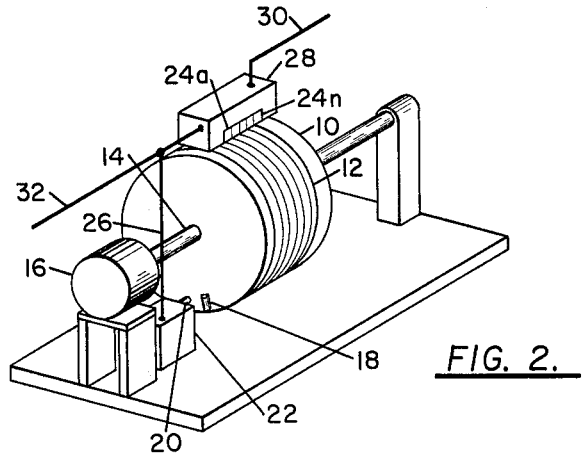
FIG. 2 illustrates a method of reproducing a seismic section.

Illustrated on FIG. 2 is a drum 10 upon which is mounted a magnetic tape 12. Magnetic tape 12 contains a plurality of side-by-side seismic traces. The drum is rotated through shaft 14 by motor 16. Mounted on the end of drum 12 is a cam 18 which upon each rotation of drum 10 operates a switch 20. Upon the closing of switch 20, a pulse is emitted by a pulse generator 22.

In one form of reproducing the signals from the magnetic tape 12 there are provided heads 24a to 24n for each trace. A pulse from pulse generator 22 is fed through conduit 26 to selector 28 which sequentially connects the output conduit 30 to heads 24a to 24n. Thus the output through conduit 30 is sequentially the various traces recorded on the recording medium 12. The read-heads 24a to 24n can be spaced or moved during reproduction of a trace to incorporate corrections as may be desired in a known manner. Alternatively suitable means for incorporation of corrections into a seismic section displayed on an oscilloscope are described in the copending application of Warren A. Alexander and Benjamin F. McCoy, Serial No. 783,482, now Patent No. 3,108,248.

Figure 1:
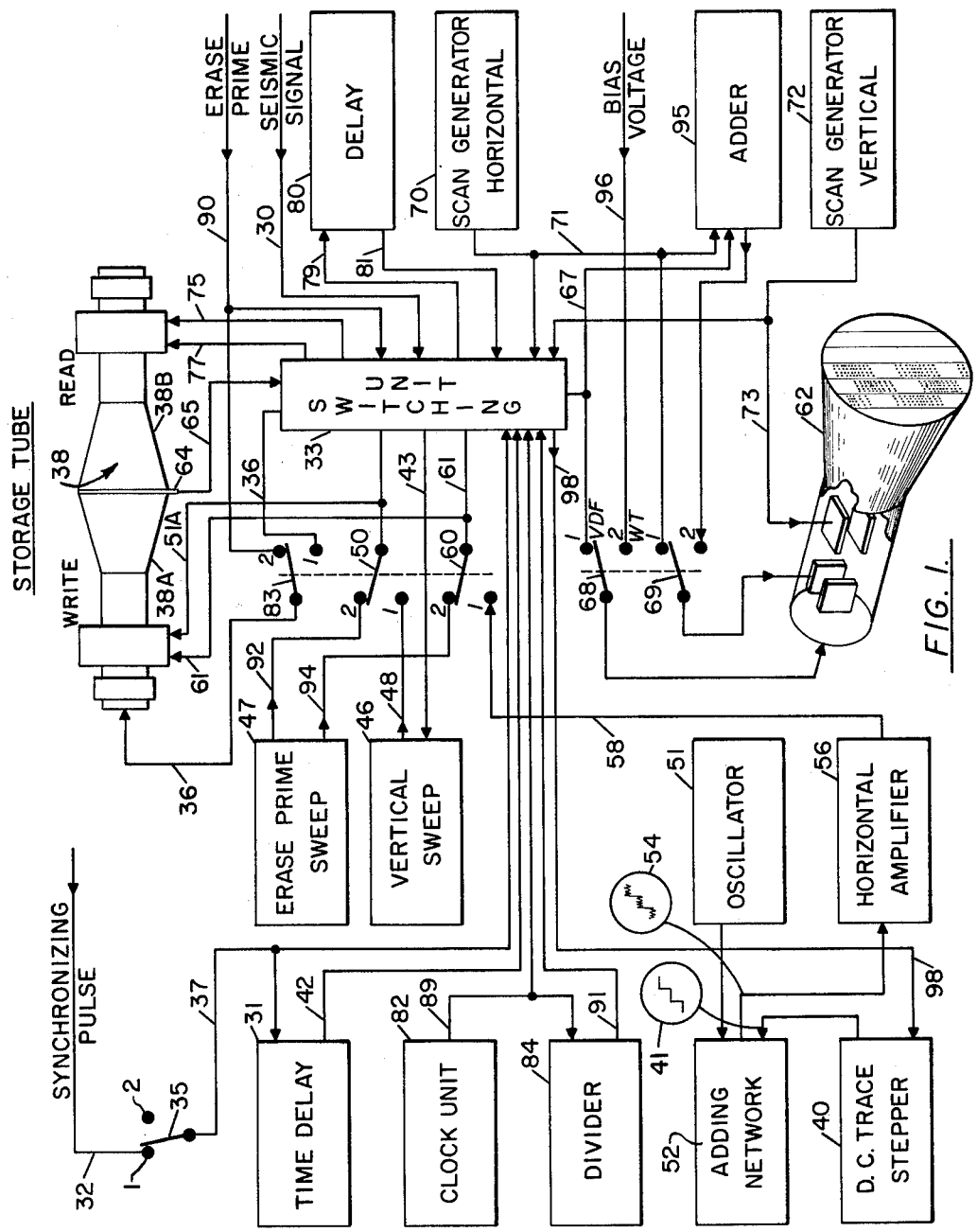
FIG. 1 illustrates, partly in schematic form and partly in block diagram form, the best mode contemplated for carrying out this invention.
Figure 3:
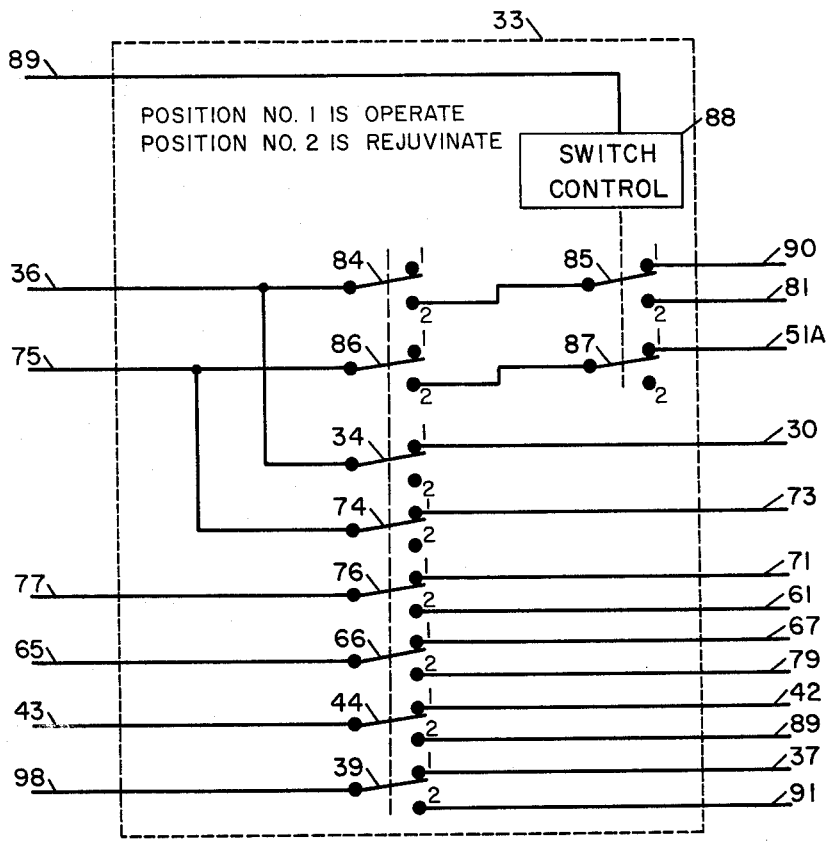
FIG. 3 illustrates a switching arrangement for use in the system of FIG. 1.

Attention will now be directed to that portion of FIG. 1 by which the seismic section is stored on the electrostatic storage tube. The seismic signal is brought in through conduit 30 from the record 12. The seismic signal of course can be brought in from any other convenient source. Conduit 30 connects through to switching unit 33 so that the seismic signal is fed through conduit 36 to the grid of an electrostatic storage tube 38. A suitable switching arrangement of switching unit 33 is shown in FIG. 3, and the details of its operations will be explained hereinafter. Storage tube 38 can, for example, be a type 7539 Graphechon scan conversion storage tube, manufactured by Radio Corporation of America. The reference numeral 38 refers to the complete storage tube, reference numeral 38A refers to the "write" section of the tube and reference numeral 38B refers to the "read" section.

The output from pulse generator 22 is fed through conduit 32 to a switch 35. When switch 35 is in its 1 position, the signal is fed to a delay unit 31 and to a D.-C. trace stepper 40 through switch 39, shown in FIG. 3, and conduit 98 when switch 39 is in its number 1 position. The signal from pulse generator 22 can be called a sweep synchronizing pulse. The pulse output occurs at the beginning of each new trace from the seismic signal storage medium 12. A seismic record is normally about 5 or 6 seconds long. However, it may be desirable to record only a selected one period of time of the record, for example the time between two seconds and three seconds. This is accomplished by the time delay unit 31, which is set to hold the sweep synchronizing pulse until two seconds have elapsed. At the end of two seconds, the sweep synchronizing pulse is fed through conduit 42, switch 44, and conduit 43 to vertical sweep means 46. Vertical sweep 46 is of a character to have an output which is a sawtooth waveform. The waveform begins immediately upon receipt of the sweep synchronizing pulse from switch 44. The output of vertical sweep 46 is fed through conduit 48 through a two-position manually-operated switch 50, which, when in the number 1 position, passes the vertical sweep signal to the vertical deflection coil of scan conversion storage tube 38A.

The output sweep signal from vertical sweep source 46 is designed to take the length of time to obtain the vertical sweep across the storage face or plate of tube 38 equal to the length or time interval of the seismic signal desired to be stored thereon. If the vertical sweep occurs between 3 and 4 seconds, for example, then that portion of the seismic record from 3 to 4 seconds is stored. The balance of the seismic trace signal is fed to the grid of the tube 38A, but as there is no vertical sweep, the signal is not stored. The "stand by" or base level current from the vertical sweep generator 46 is adjusted so that the cathode ray beam of storage tube 38A is deflected just beyond the edge of the storage face.

Attention will now be directed toward that part of the apparatus of FIG. 1 which illustrates how the information on the storage plate of tube 38 is advanced horizontally for the next succeeding seismic signal of the seismic section and also how that portion of the storage plate representing a seismic signal is given a selected width. The sweep synchronizing signal is fed through switch 39 when in the "on" position or 1 position to D.-C. trace stepper 40 through conduit 98. The output of D.-C. trace stepper 40 is a stairstep waveform as illustrated at 41. It will be noted that the levels of the waveform are essentially lines having no width. To provide width to the horizontal components an oscillator 51 is provided. The output of oscillator 51 is added to the output of D.-C. trace stepper 40 in adding network 52. The output of adding network 52 is illustrated at waveform 54. Waveform 54 is fed to horizontal amplifier 56. The output of horizontal amplifier 56 is fed through conduit 58 and through a two-position switch 60, when the switch is in the number 1 position, to the horizontal deflection means of storage tube 38 through conduit 61.

To briefly recapitulate, it is seen then that a seismic signal is fed from conduit 30 to the grid of the storage tube 38A. A sweep synchronizing signal is generated at the beginning of each such seismic signal and causes the output of D.-C. trace stepper 40 to raise its level so that the "strip" on the storage means of tube 38A being energized or selectively charged is moved horizontally a selected amount representing a trace width. The particular portion of the seismic signal recorded is controlled by the time delay unit 31 and by the duration of the output of the vertical sweep 46. To give the storage strip width for each trace, oscillator 51 is provided which in a sense modulates the step signal 41. This is repeated for each signal of the portion of the seismic section desired to be stored on the storage face of tube 38.

Having described how the seismic section is stored on the storage means of tube 38, attention will now be directed toward the display of such stored data on a cathode ray tube 62, for example. An output signal is taken from the output signal electrode 64 of tube 38 and is fed through conduit 65 containing switch 66, shown in FIG. 3, and through conduit 67 containing switch 68 to the grid of cathode ray tube 62. This occurs when switches 66, 68, and 69 are in their number 1 position. The purposes of the number 2 positions of these switches will be discussed hereinafter. The sweep of storage tube 38 is synchronized with the sweep of cathode ray tube 62. This is accomplished by horizontal scan generator 70 and vertical scan generator 72. The output of scan generator 70 is fed to the horizontal deflection plates of tube 62 through conduit 71 and switch 69 and also to the horizontal deflection coils of the output or read section 38B of tube 38 through switch 76 and conduit 77. Likewise, the output of vertical scan generator 72 is fed to the vertical deflection plates of tube 62 through conduit 73 and to the vertical deflection coils of the output section of storage tube read section 38B through switch 74 and conduit 75. When displaying the information from storage tube 38 on the face of cathode ray tube 62, switches 74 and 76, shown in FIG. 3, are in their number 1 position so that the horizontal scan generator 70 is connected through switch 76 and conduit 77 to the horizontal deflection coils of the read section of storage tube 38B, and the vertical scan generator 72 is connected through switch 74 and conduit 75 to the vertical deflection coils of the output section of storage tube 38B.

As shown in FIG. 3, switches 84, 86, 34, 74, 76, 66, 44 and 39 are ganged such that when one is in its 1 position, the others are likewise in the 1 position, or if in the number 2 position, the others are all in their number 2 position. As shown, these switches are all operated manually; however, a relay having a plurality of circuits or an electronic switch of any well known type could be used for automatic operation. To recapitulate, when these switches are in their 1 position, the system operates to selectively charge the storage tube 38A with the incoming seismic signal and to simultaneously display the information stored upon the charged plate upon the face of the tube 62. When the switches 84 and 86 are in their 1 position, switches 85 and 87 are inoperative. In this condition, the seismic signal comes in on conductor 30 through switch 34, in its 1 position, through conduit 36 to the grid of the write storage tube 38A. The vertical sweep signal comes through conduit 48, switch 50, when in position 2, and to the vertical deflection plates of the write end section 38A of tube 38 through conduit 51A.

The vertical sweep signal for the read end tube 38B comes from vertical scan generator 72 through switch 74 when in its 1 position and through conduit 75. The sweep signal from scan generator 72 is also fed to the vertical deflection plates of scope tube 62. The horizontal signal and control for the write portion 38A of tube 38 comes from horizontal amplifier 56 through conduit 58, switch 60, and conduit 61. During this time the horizontal scan generator 70 supplies the horizontal scan signal to the read portion of tube 38B through switch 76, which is in its 1 position and conduits 71 and 77. When the switches are in this position, the seismic signal is recorded through the write end to the storage face of tube 38 and it is also read from the read end of tube 38 and displayed on the scope 62. The display on cathode ray tube 62 then is seen to be that portion of the seismic section stored on the storage face of storage tube 38.

The duration of good quality storage on the storage face of electrostatic storage tube 38 is normally much less than the time desired for studying the seismic section displayed on tube 62. The display on the face of tube 62 is only good so long as the stored information is of good quality. To be assured that the quality of the storage information is maintained high, means are provided to rejuvenate this stored information. That portion of the apparatus which provides for rejuvenation of the stored information will now be discussed. When it is desired to rejuvenate the stored signal, the switches 84, 86, 34, 74, 76, 66, 44 and 38 which are conveniently ganged are all put in their number 2 position, such as by manual operation. Information read from storage face of tube 38 is passed through output signal electrode 64, conduit 65, switch 66 and conduit 79 to a delay line 80.

The stored information is delayed sufficiently by delay line 80 so that that portion of the storage plate of tube 38 occupied by that trace can be erased and primed. This is accomplished by placing switches 85 and 87 (of FIG. 3) in the 1 position. Switches 85 and 87 are preferably electronic switches which alternate between their 1 and 2 positions upon receipt of a pulse from clock 82 through conduit 89. The clock unit can be any conventional unit having timed output pulses. Vertical sweep generator 46 is now controlled by clock unit 82 through conduit 89, switch 44 which is in its number 2 position, and conduit 43. The erase and prime signal 90 is fed through switch 85 while in its 1 position to the input or write side of tube 38A through switch 84 and conduit 36. When switch 85 alternates to its 2 position, the signal from delay line 80 is fed to the input of tube 38. Switch 85 alternates between positions 1 and 2 upon receiving a pulse from clock unit 82. The output of clock 82 is also fed to divider 84. Divider 84 is of a type to permit passage of only the alternate pulses. The output of divider 84 is fed through conduit 91 to switch 39. As switch 39 is now in its number 2 position, D.-C. trace stepper 40 moves only on every other pulse from clock unit 82. This permits one sweep of vertical sweep 46 to erase and prime the trace area on the storage plate of tube 38 and the second vertical sweep to recharge the trace strip with the signal coming from delay means 80. The signal in delay means 80 then is seen to be delayed for a period equal to one vertical sweep from the output of vertical sweep generator 46. It is preferred to have a two-speed vertical sweep generator 46, one speed being of a longer sweep and the other of a shorter sweep. The shorter sweep speed is for the rejuvenation process and the longer sweep speed is for the placing of the seismic signal thereon originally. When in the rejuvenation position, the vertical sweep signal means 46 is put into its fast speed, which for example, may be in the neighborhood of about 15,000 cycles per second as compared for example to a slow speed of 1 cycle per second. The vertical sweep signal from vertical sweep generator 46 goes through conduit 48 to both the write side and to the read side of tube 38. This is accomplished by going through switch 50, which is in the number 2 position, conduit 51A, switch 87 when in its number 1 position and through conduit 75 to the vertical deflection means of the write-out section 38B of tube 38. Also during this time the horizontal scan means 70 is switched out of the system by switch 76 when in position 2. Thus the horizontal amplifier signal from horizontal amplifier 56 passes through switch 60 to the horizontal coils of the write section of tube 38A and through conduit 61, switch 76, and conduit 77 to the horizontal deflection means of the read section 38B of tube 38. During the rejuvenation portion of this operation, then, the write and read scanning beams of tube 38 follow each other both on the vertical sweep and the horizontal control with a slight phase displacement on the vertical sweeps to permit the stored information to be read before it is erased. This permits perfect synchronization of the two sweeps. During this time, due to the dividing action of divider 84 on the pulses from clock unit 82, there are two vertical sweeps for each horizontal trace step from horizontal trace stepper 40. This permits the grid of tube 38A to be connected to the erase-prime signal while switch 85 is in its 1 position. During the first vertical sweep the output of read tube 38B goes through conduit 65, switch 66 (No. 2 position) to conduit 79 to delay line 80. During the second or alternate sweeps, switch 85 is in its 2 position which connects the grid of tube 38A to the delay line 80. The delay line holds the stored information for a period equal to one vertical sweep and then passes it through switch 85 when in the 2 position through conduit 36 to the grid of the write side of tube 38A. During this time switch 87 sweeps back and forth from its 1 and 2 positions in synchronism with switch 85. Switch 85, when in its 2 position, disconnects the vertical sweep generator 46 from the vertical deflection coils of tube 38B during the time that the delayed signal from delay unit 80 is being applied to the write grid of tube 38A through switch 85. When switch 85 is in its 1 position, the vertical sweep from sweep generator 46 passes through switch 50, through conduit 51A, through switch 87, and through conduit 75 to the vertical deflection coils of tube 38B. This prevents a signal from going to delay means 80 during the time that the rejuvenated signal is being stored on the storage face of tube 38.

Before starting to store information on the storage plate of tube 38, it is desired that the plate be free of any previously stored information. This is easily accomplished by placing switches 50, 60 and 83 in their number 2 position. Erase-prime sweep generator 47 has a vertical sweep connected to the 2 position of switch 50 through conduit 92, and a horizontal sweep connected to the 2 position of switch 60 through conduit 94. The erase-prime signal 90 is connected to the 2 terminal of switch 83. The erase-prime signal goes through conduit 90, through switch 83, and to conduit 36. The vertical sweep signal goes through conduit 92 through switch 50 when in its 2 position to conduit 51A. The horizontal signal goes through conduit 94 through switch 60 when in its number 2 position to conduit 61. Thus the required erase-prime signal from 90 is applied to the grid of tube 38A, and vertical and horizontal sweep signals from generator 47 are applied to the sweep means of tube 38A to provide the desired clearing of the storage face of tube 38.

It is frequently found desirable to observe the seismic section in more than one way. For example, a variable density presentation shows a good overall cross section of the earth's subsurface while a wiggly trace or galvanometer-type section permits more exact corrections to be applied. Switches 68 and 69 are provided to accomplish this change from one type of section to the other as displayed on cathode ray tube 62. For the variable density presentation, the seismic signal from storage tube 38 is applied to the grid of tube 62 whenever switches 68 and 69 are in the 1 position. The horizontal scan from generator 70 is applied through switch 69 to the horizontal deflection plates of tube 62. For a wiggly-trace presentation, however, switches 68 and 69 are placed in their 2 position, which applies the seismic signal from conduit 67 through adder circuit 95 where it is added to the horizontal scan from generator 70. From adder circuit 95 the signal goes through switch 69 to the horizontal deflection plates of cathode ray tube 62. The control grid of tube 62 is connected through switch 68 to a bias voltage supply through conduit 96. The bias voltage preferably should be adjustable to vary the intensity of the trace on the face of tube 62.

While there are above disclosed but a limited number of embodiments of the system of the invention herein presented, it is possible to produce still other embodiments without departing from the inventive concept herein disclosed. It is therefore desired that only such limitations be imposed on the appended claims as are stated therein.

What is claimed is:

1. A system for use in displaying a seismic signal which comprises: electronic charge storage means having a write section and a read section; first vertical sweep generator having a fast speed and a slow speed and connected to the vertical coil means of said write section; a D.-C. step switcher electrically connected to the horizontal coil means of the write section of said storage means; an oscilloscope; a second vertical sweep generator means connected to the vertical deflection coil means of the read section of said storage means and to the vertical deflection coil means of said oscilloscope; a horizontal scan generator means connected to the horizontal deflection coil means of the read section of said storage means and to the horizontal deflection coil means of said oscilloscope; means connecting the seismic signal to the grid of said write section of said storage means; means connecting the read electrode of said storage tube to the grid of said oscilloscope means; a delay line having a delay equivalent to the duration of one sweep of said vertical sweep generator means when in its fast position; first switching means operable to disconnect said read electrode from the grid of said oscilloscope means and connect the said read electrode to said delay line; second switching means operable to disconnect the vertical coil means and horizontal coil means of said read section from said second vertical scan generator means and said second horizontal scan generator means and to connect same to the first vertical sweep generator means and to said D.-C. stepper respectively; first pulsing means to simultaneously pulse said first vertical sweep generator means and said D.-C. stepper while said seismic signal is being transmitted to said write section of said storage means; second pulsing means operable to trigger said first vertical sweep generator means and to trigger said D.-C. stepper at the beginning of every other sweep of said first vertical sweep generator means; an erase-prime source; means to connect the erase-prime source to the grid of said write section during the every other sweep of said first vertical sweep generator means; and means to connect the output of said delay line to the input grid of said write section during the alternate sweeps of said first vertical sweep generator means.

2. A system for use in displaying a seismic signal which comprises: an electronic charge storing means having a write section and a read section; first vertical sweep generator means; first horizontal scan generator means; a second vertical sweep generator means; a second horizontal scan generator means; an oscilloscope means; means connecting said first vertical sweep generator means to the vertical coil means of said write section and the horizontal scan generator means to the horizontal coils of said write section; means connecting the seismic signal to the grid of said write section; means connecting the second vertical sweep generator means to the read section and connecting the horizontal scan generator means to the horizontal coils of the said read section and to the horizontal plate means of said oscillator means; means connecting the read electrode of said storage tube to the grid of said oscilloscope means; a delay line; switching means operable to disconnect said read electrode from the grid of said oscilloscope means and connect same to said delay line and to connect the output of said delay to the input grid of said write section, said switching means operable to disconnect the vertical and horizontal coil means of said read section from said second scan generator and said second vertical scan generator and to connect same to the first vertical sweep generator means and to said first horizontal scan generator means.

References Cited by the Examiner
UNITED STATES PATENTS

| 2,474,628 | 6/1949 | Hurvitz | 315—9 |
| 2,521,635 | 9/1950 | Kornei | 315—9 X |
| 2,617,963 | 11/1952 | Arditi | 315—9 X |
| 2,717,976 | 9/1955 | Baker | 315—9 X |
| 2,922,070 | 1/1960 | Seevers | 315—9 X |

DAVID J. GALVIN, *Primary Examiner.*
ROBERT SEGAL, *Examiner.*